Sept. 22, 1942.   V. G. REILING   2,296,740
DOUBLE-V BELT
Filed Feb. 15, 1941   2 Sheets-Sheet 1
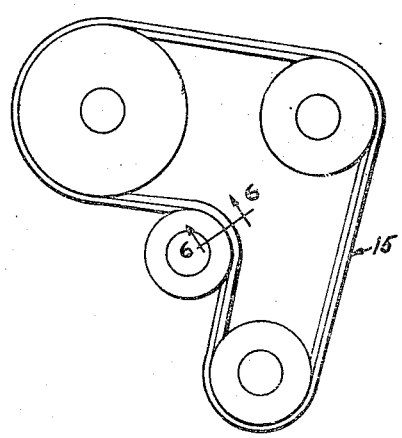
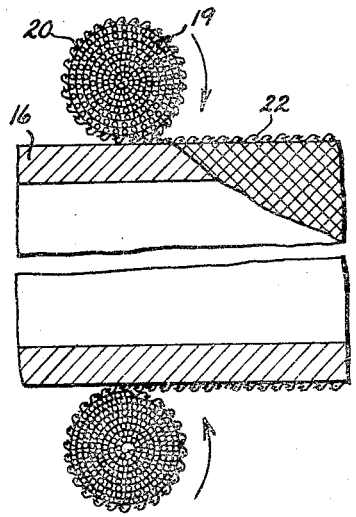
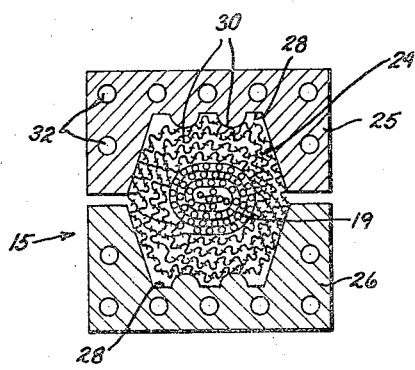
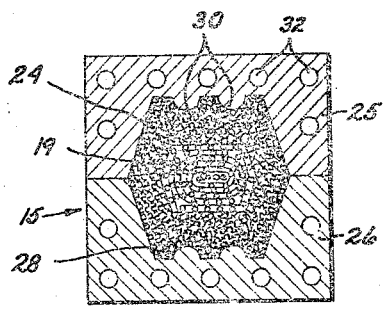
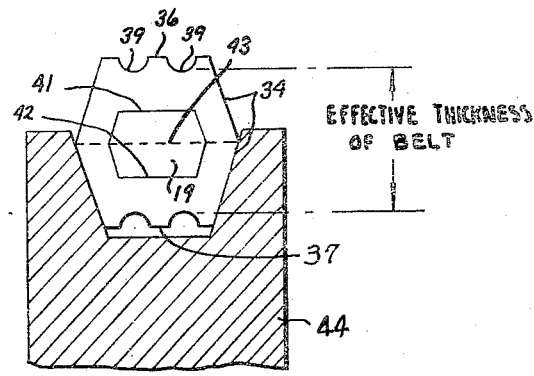
INVENTOR
VICTOR G. REILING
BY
ATTORNEYS Sept. 22, 1942.  V. G. REILING  2,296,740
DOUBLE-V BELT
Filed Feb. 15, 1941  2 Sheets-Sheet 2
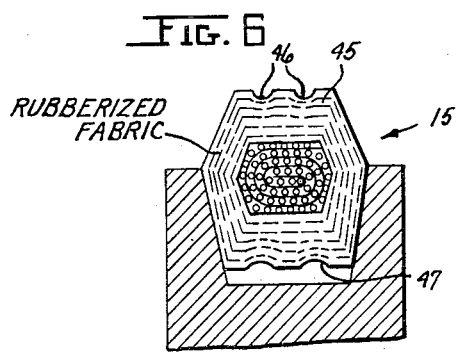
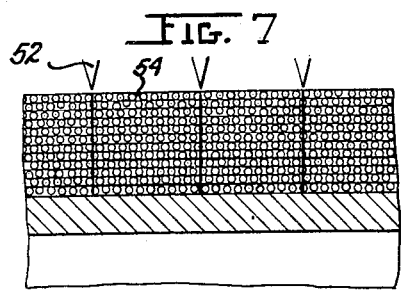
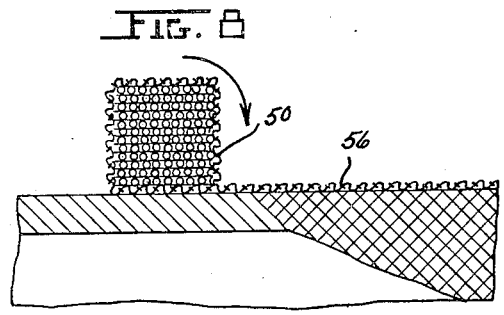
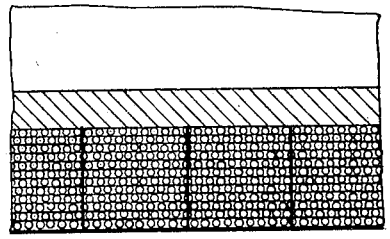
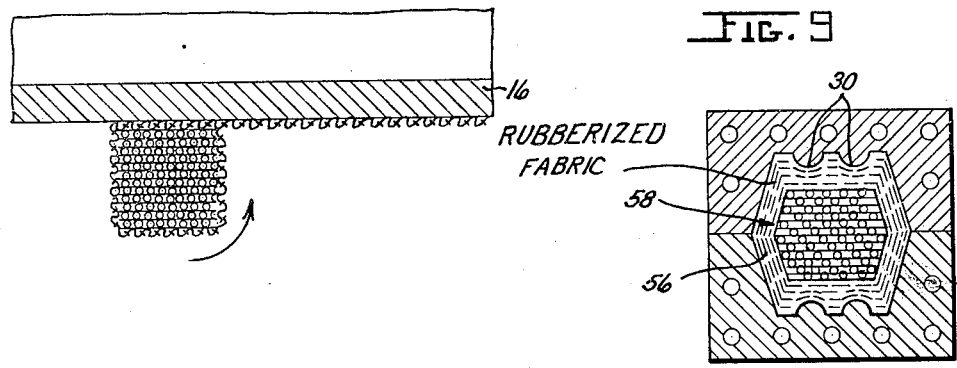
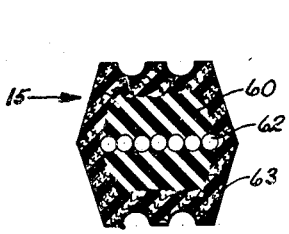
INVENTOR
VICTOR G. REILING
BY
ATTORNEYS Patented Sept. 22, 1942

2,296,740

UNITED STATES PATENT OFFICE 2,296,740

DOUBLE-V BELT

Victor G. Reiling, Dayton, Ohio, assignor to The Dayton Rubber Mfg. Company, Dayton, Ohio, a corporation of Ohio Application February 15, 1941, Serial No. 379,106

6 Claims. (Cl. 74—234)

My invention relates to double-V belts and their method of construction.

It is an object of this invention to provide an improved belt constructed of rubberized fabric which is stabilized by the arrangement of the fabric layers so that the tendency of the belt to twist or turn over in the groove of the pulley is eliminated.

Another object of this invention is to provide a double-V belt which will transmit power with equal facility and efficiency regardless of the direction of flexure about a neutral axis plane extending longitudinally of the belt. This improved construction permits the use of the belt to drive one or more V-sheave pulleys rotating in different directions by contacting the belt therewith without the necessity of twisting or crossing the belt as has been the general practice heretofore.

Another object of this invention is to devise an improved method of making a double-V belt having a rectangular shaped inner cord section arranged so that the longitudinal face is parallel to the top and bottom outer surfaces of the finished belt and wherein the neutral axis section of the belt lies more nearly in a central plane parallel to the top and bottom surfaces of the belt.

Another object is to provide an improved double-V belt having a fluted top and bottom surface and wherein the belt is so molded that the flexibility of the belt has been decreased when flexed about a transverse axis and materially increased when flexed about a longitudinal axis.

Another object is to devise a method of making a double-V belt comprising a strength cord section which is so shaped and molded that the flexibility is restricted except in two directions and along a plane parallel to the top and bottom surfaces of the belt.

Another object is to provide a belt of the character described wherein the resistance to tortional stresses is substantially improved and wherein the internal stresses developed in the belt during flexing are reduced to a minimum.

Another object is to provide an improved belt of the type mentioned wherein the stresses set up in the outer fabric section when under tension or compression are substantially relieved by grooves running longitudinally of the belt along the top and bottom surfaces.

These and other objects and advantages will be apparent from the following description taken in connection with the drawings, wherein Figure 1 illustrates diagrammatically the use of the belt made according to this invention for rotating pulleys in reverse directions;

Figure 2 is a fragmentary sectional view, partly broken away, illustrating the method of applying the rubberized fabric to the core or central built-up cord body portion forming the strength section by placing the rubberized fabric on the surface of a drum and rolling the core thereover;

Figure 3 is a sectional view taken through a mold showing the preformed belt placed therein preparatory to molding the belt to the desired shape;

Figure 4 is a similar cross section taken through the mold and showing the final cross sectional shape of the belt after the molding treatment is substantially completed;

Figure 5 is a fragmentary sectional view of a double-V belt positioned in the sheave of a pulley illustrating diagrammatically the effective working surfaces of the belt;

Figure 6 is a cross sectional view taken on the line 6—6 of Figure 1 illustrating diagrammatically the alteration of the grooved portion and adjacent body part of the belt when the outer surface of the belt is placed under tension and the inner side is subjected to compression;

Figure 7 illustrates a modified way of forming the cord section of the belt by building up several layers of rubberized fabric onto a drum and then cutting the same circumferentially forming a rectangular shaped strength section preparatory to applying rubberized fabric thereover to produce the belt;

Figure 8 is a similar view as Figure 2 illustrating the rolling up of the outer layers of rubberized fabric around the square cord section in forming the belt;

Figure 9 is a cross sectional view taken through a mold showing the molded shape of the belt built up as shown in Figures 7 and 8;

Figure 10 illustrates a modified double-V belt construction wherein a single cord layer is utilized as the strength section which is embedded in "Stiflex."

Referring to the drawings in detail, the double-V belt of my invention, generally designated 15, is preferably made by building up the various rubberized fabric layers on the surface of a drum of the desired diameter, such as indicated at 16. The central strength section is formed by applying a rubber-impregnated and coated band of strength cord 19 on the periphery of a cylindrical drum, such as 16, and rolled to form a toroid 20 of the proper size. Around this toroid member is wound rubberized fabric 22 which preferably has been placed upon a similar drum surface, as shown in Figure 2, and the toroid rolled thereover to wind the fabric layer 22 spirally around the inner toroid strength section 20 until a belt of the desired size is formed. The weave of the rubberized fabric material 22 is preferably square woven bias laid whereby the final composite toroid belt body 24 formed may be readily flexed in any direction without injury.

The toroid belt body 24 is then molded into a finished belt of hexagonal shaped cross section by placing the preformed belt body 24 in a mold, such as illustrated in Figure 3. To form the circular belt the mold may comprise a ring-like member having the mold halves 25 and 26 which are provided with a cavity 28 for receiving the belt body 24 during molding. The inner bottom surfaces of the mold halves 25 and 26 comprise equally spaced ribs 30 which mold elongated grooves in the opposite sides of the belt forming a fluted top and bottom surface. The mold may be heated by passing steam or hot water through the fluid passageways 32.

Preferably the molded belt is hexagonal shaped in cross section, as illustrated in Figure 5, and comprises side traction surfaces 34 which are shorter than the top and bottom surfaces 36 and 37. The angles formed between the opposite adjacent faces of the belt are equal and the resulting polygon is regular but has two broad surfaces 36 and 37 forming the top and bottom faces of the belt respectively which are fluted as at 39. The grooves or flutes 39 extend longitudinally of the belt along the outer and inner surfaces and are formed during molding by the spaced rib portions 30 of the mold sections 25 and 26.

When the fabricated toroid belt body 24 is placed in the mold, as illustrated in Figure 3, and the pressure applied, the ribs 30 in the mold halves 25 and 26 contact the belt body and compress the adjacent interposed portions of the belt body. This force is transmitted through the built-up layers of the belt onto the surfaces of the toroid cord strength section 19 changing its cross sectional shape from circular, as illustrated in Figure 3, to a hexagonal shaped central core, such as shown in Figure 4. At the same time, the pressure of the ribs conforms the flexible outer fabric to the smooth side walls and produces the fluted shaped top and bottom surfaces.

The formation of the rectangular cord section 24 such that the long faces 41 and 42 are parallel to the top and bottom surfaces of the finished belt is an essential feature of this invention, for, in this way, the neutral axis of the belt lies more nearly in a central plane, such as indicated by the dotted line 43 in Figure 5, which coincides with the axis plane of the strength cord section 19. This represents a theoretical plane of no deformation under flexure. A belt is thus provided which is readily flexible about the neutral axis plane which extends longitudinally of the belt and coincides with the dotted line 43. Flexing of the belt about this axis in either direction is permitted without setting up undue stress in the belt body which would tend to accelerate the breakdown and failure of the belt in service.

As described, the ribs 30 on the inner mold surfaces not only function to form the core or strength section 19 so that its cross sectional shape conforms with the general cross sectional shape of the finished belt, but also form the flutes or grooves 39 in the belt body which extend longitudinally along the top and bottom surfaces of the belt. The fluted surfaces give to the double-V belt an effective thickness which is less than the actual thickness without sacrificing depth and frictional surface area as required for the belt to properly wedge into a V-sheave pulley 44 and operate, as illustrated in Figure 5. Moreover, this fluting of these surfaces does not alter the crosswise rigidity of the belt. An improved belt is therefore provided having in effect a double-V belt closely approaching a rectangular shape in cross section which is properly reinforced so as to wedge into V-sheaves, yet is flexible in the normal plane to the top and bottom faces of the belt. Originally, the unmolded toroid belt body was equally flexible in all directions, whereas after molding, this flexibility has been decreased about a plane normal to the top and bottom faces of the belt and substantially increased when flexed about a neutral axis plane parallel to the top and bottom faces of the belt. This shaping of the belt so as to restrict its flexibility except in two directions and providing resistance to tortional stresses is the essential improvement in my double-V belt. A belt made in this way is very stable and so bonded that no twisting or tortional stresses are set up in the belt when it is flexed about a neutral axis plane parallel to the top and bottom surfaces of the belt.

As illustrated in Figure 6, the flexure of the double-V belt will be accompanied by stressses in the outer sections placing them under tension or compression. In the outer fabric portion which is placed under tension, such as indicated at 45 in Figure 6, the flutes 39 tend to relieve the strain in the fabric by permitting cold flow of the material from the valley into the ridge portions forming narrower grooves, as illustrated at 46 in Figure 6, without otherwise distorting the belt. The fluted bottom face of the belt, which is placed under compression, tends to relieve the stress on the fabric portion by allowing cold flow of the rubber from the ridges into the valleys of the grooves forming wider and shallower grooves, as shown at 47. When subjected to working stresses as upon passing around a pulley the flutes move inwardly to take up the tensile stresses and outwardly for relieving the compression stresses and thereby provide a double-V belt which is very durable.

By my improved method of construction a double-V belt exhibiting a substantial increase in stability and service life is produced. The unexpected results are effected primarily by the fluted construction of the top and bottom faces of the belt. As mentioned, this functions not only to relieve the tension and compression stresses during the use of the belt but also changes the cross sectional shape of the central strength cord section during molding of the belt whereby the strength section conforms to the outer cross sectional shape of the belt and locates the central core so that its neutral axis plane coincides with the neutral axis plane of the composite belt, producing a balanced double-V belt having improved wear resistant properties.

In Figures 7, 8 and 9 a modified belt construction is illustrated wherein the innermost cord strength section of the belt is made up of a rectangular or square shaped cross sectional toroid, generally designated 50. This toroid strength section is formed, as illustrated in Figure 7, by laying the fabric and cord on the periphery of a drum 16 and a plurality of rectangular shaped toroid cord sections cut circumferentially of the drum by the knives 52 as indicated at spaced intervals by line 54. Thereafter, the built-up toroid strength section 50 is covered with rubberized fabric layers 56 similarly as in Figure 2 and the built-up belt body, generally designated 58, is placed in a mold similar to that illustrated in Figure 3 having the inner spaced ribs 30. In compressing the mold halves together onto the belt body the ribs 30 compress the top and bottom portions of the inner strength section 50 so as to flatten out the material and cause it to form an inner body portion of rectangular shape and conform generally to the outer cross sectional shape of the finished belt.

In Figure 10 another modification is illustrated wherein the innermost strength section is made up of "Stiflex" 60 and a central cord layer 62 around which is wrapped rubberized fabric layers 63 and the belt is molded similarly as shown in Figures 3, 4 and 9. In this instance, the inner strength section comprising "Stiflex" body portion 60 and embedded cord layer 62 is first preformed to the desired shaped toroid prior to forming a built-up belt by rolling the inner strength section as a toroid onto the rubberized fabric layer 63. Thereafter it is molded to form a belt of the desired shape. Preferably, only one layer of cord is laid in the central portion of the "Stiflex" 60 and the cord forms the neutral axis plane of the belt. However, one or more cord layers may be used as desired.

It will be also understood that my invention is not limited to the exact details of construction as shown in the drawings and described but that various modifications may be made by those skilled in the art without departing from the spirit of my invention.

Having thus fully described my invention, what I claim as new and desire to secure by Letters Patent is:

1. As an article of manufacture, an improved double-V belt having a hexagonal shaped inner strength section, said strength section being made up of a convolute toroid body, a plurality of superimposed rubberized fabric layers laid around said strength section and integrally united therewith to form a unitary belt, said belt comprising fluted top and bottom outer surfaces.

2. As an article of manufacture, an improved double-V belt having a hexagonal shaped inner strength section, said strength section being made up of rubber composition reinforced with fine textile fibres and cord, said cord lying substantially along the neutral axis plane of the belt and extending longitudinally thereof, said belt having fluted top and bottom faces.

3. As an article of manufacture, a six-sided belt which is adapted to transmit power with equal facility on two sets of opposite working surfaces, comprising a central strength section of hexagonal shape, the neutral axis of said belt lying in a central plane, said belt having longitudinal grooves on two opposite surfaces comprising the top and bottom surfaces thereof, whereby the formation of said grooves during molding of the belt assists in the shaping of the belt side walls and causes the cross sectional shape of the core to conform substantially to the cross sectional shape of the belt, the said grooves permitting flexing of the belt about a neutral axis plane parallel to the top and bottom of the belt when the belt is flexed in both directions.

4. As an article of manufacture, a six-sided belt which is adapted to transmit power with equal facility on two sets of opposite working surfaces, comprising a central strength section of hexagonal shape formed of an involute body of cord and rubberized fabric, the neutral axis of the belt lying in a central plane, said belt having longitudinal grooves on two opposite surfaces comprising the top and bottom surfaces thereof, whereby the formation of said grooves during molding of the belt assists in the shaping of the belt side walls and causes the cross sectional shape of the core to conform substantially to the cross sectional shape of the belt, the said grooves permitting flexing of the belt about a neutral axis plane parallel to the top and bottom of the belt when the belt is flexed in both directions.

5. As an article of manufacture, a six-sided belt which is adapted to transmit power with equal facility on two sets of opposite working surfaces, comprising a central strength section of hexagonal shape formed from a rolled toroid, the neutral axis of said belt lying in a central plane, said belt having longitudinal grooves on two opposite surfaces comprising the top and bottom surfaces thereof, whereby the formation of said grooves during molding of the belt assists in the shaping of the belt side walls and causes the cross sectional shape of the core to conform substantially to the cross sectional shape of the belt, the said grooves permitting flexing of the belt about a neutral axis plane parallel to the top and bottom of the belt when the belt is flexed in both directions.

6. As an article of manufacture, a six-sided belt which is adapted to transmit power with equal facility on two sets of opposite working surfaces, comprising a central strength section of hexagonal shape formed of a body of plastic material having embedded therein a central cord layer, the neutral axis of said belt lying in a central plane, said belt having longitudinal grooves on two opposite surfaces comprising the top and bottom surfaces thereof, whereby the formation of said grooves during molding of the belt assists in the shaping of the belt side walls and causes the cross sectional shape of the core to conform substantially to the cross sectional shape of the belt, the said grooves permitting flexing of the belt about a neutral axis plane parallel to the top and bottom of the belt when the belt is flexed in both directions.

VICTOR G. REILING.